United States Patent
Haldeman et al.

(10) Patent No.: US 12,240,589 B2
(45) Date of Patent: Mar. 4, 2025

(54) LINEAR ACTUATOR SYSTEM

(71) Applicant: Textron Innovations Inc., Providence, RI (US)

(72) Inventors: Andrew Paul Haldeman, Fort Worth, TX (US); Robert Reynolds, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 269 days.

(21) Appl. No.: 18/079,352

(22) Filed: Dec. 12, 2022

(65) Prior Publication Data

US 2024/0190554 A1    Jun. 13, 2024

(51) Int. Cl.
| | |
|---|---|
| *B64C 11/30* | (2006.01) |
| *B64C 27/20* | (2023.01) |
| *B64C 27/52* | (2006.01) |
| *B64C 29/00* | (2006.01) |
| *B64D 35/04* | (2006.01) |
| *F16H 57/02* | (2012.01) |

(52) U.S. Cl.
CPC ............. *B64C 11/30* (2013.01); *B64C 27/20* (2013.01); *B64C 27/52* (2013.01); *B64C 29/0033* (2013.01); *B64D 35/04* (2013.01); *F16H 2057/02043* (2013.01)

(58) Field of Classification Search
CPC ......... B64C 11/30; B64C 27/20; B64C 27/52; B64C 29/0033; B64D 35/04; F16H 2057/02043
USPC .......................................................... 416/48
See application file for complete search history.

(56) References Cited

U.S. PATENT DOCUMENTS

| | | | | |
|---|---|---|---|---|
| 2,478,244 | A * | 8/1949 | Cooley ................... | B63H 3/04 416/163 |
| 3,095,932 | A * | 7/1963 | Hercules ................. | B63H 3/04 416/162 |
| 4,317,359 | A * | 3/1982 | Georg ...................... | B30B 1/22 72/454 |
| 4,781,533 | A * | 11/1988 | Andersson ............. | B63H 3/082 416/157 R |
| 5,092,539 | A * | 3/1992 | Caero ................... | F16H 25/2204 254/102 |
| 5,249,924 | A * | 10/1993 | Brum ...................... | F03D 15/10 416/162 |
| 5,282,732 | A * | 2/1994 | Eggert .................... | B29C 33/26 425/188 |
| 5,462,410 | A * | 10/1995 | Smith ..................... | B64C 11/30 416/165 |
| 5,897,293 | A * | 4/1999 | Arel ....................... | B64C 11/303 416/49 |
| 6,077,040 | A * | 6/2000 | Pruden ................... | B64C 11/38 416/157 R |

(Continued)

*Primary Examiner* — Kurt Philip Liethen
*Assistant Examiner* — John D Bailey
(74) *Attorney, Agent, or Firm* — Bradley Arant Boult Cummings LLP (57) ABSTRACT

A linear actuator for axially translating a control tube to change the pitch of rotor blades at a top portion of the control tube, the linear actuator including an outer sleeve fixed in a stationary position with the control tube extending through the outer sleeve, a screw nut connected by a threaded interface to the control tube, and an actuator motor coupled to the screw nut to rotate the screw nut and thereby translate the control tube.

19 Claims, 5 Drawing Sheets

(56) References Cited

U.S. PATENT DOCUMENTS

| | | | | |
|---|---|---|---|---|
| 8,167,553 B2* | 5/2012 | Perkinson | B64C 11/42 | 416/162 |
| 8,231,345 B2* | 7/2012 | Robinson | B60K 11/04 | 416/162 |
| 11,420,762 B2* | 8/2022 | Thompson | B64C 11/001 | |
| 11,827,344 B2* | 11/2023 | Truong | B64C 27/20 | |
| 2002/0096060 A1* | 7/2002 | Kohno | B30B 1/186 | 100/48 |
| 2004/0232280 A1* | 11/2004 | Carter | B64C 27/52 | 244/17.25 |
| 2008/0101934 A1* | 5/2008 | Stamps | B64C 27/33 | 416/134 A |
| 2009/0060739 A1* | 3/2009 | Robinson | B60K 11/04 | 416/162 |
| 2010/0310369 A1* | 12/2010 | Perkinson | B64C 11/36 | 416/155 |
| 2014/0124615 A1* | 5/2014 | Thompson | B64C 27/605 | 416/112 |
| 2015/0321754 A1* | 11/2015 | Uebori | B64U 10/17 | 244/17.23 |
| 2016/0114887 A1* | 4/2016 | Zhou | B60F 5/02 | 348/148 |
| 2016/0195113 A1* | 7/2016 | Bihel | F15B 18/00 | 91/216 R |
| 2016/0368601 A1* | 12/2016 | Avery | B64C 27/605 | |
| 2017/0297738 A1* | 10/2017 | von Flotow | B64D 1/12 | |
| 2018/0327089 A1* | 11/2018 | Shimek | B32B 27/38 | |
| 2018/0370621 A1* | 12/2018 | Heverly, II | B64C 27/001 | |
| 2019/0135424 A1* | 5/2019 | Baity | B64C 29/0033 | |
| 2019/0257638 A1* | 8/2019 | Roberts | G01D 5/2053 | |
| 2019/0329882 A1* | 10/2019 | Baity | B64U 30/14 | |
| 2021/0094674 A1* | 4/2021 | Thompson | B64D 27/24 | |
| 2021/0122463 A1* | 4/2021 | Bernard | B64C 27/52 | |
| 2021/0139157 A1* | 5/2021 | Thompson | B64C 27/32 | |
| 2021/0403161 A1* | 12/2021 | Burns | B64U 10/20 | |
| 2022/0126996 A1* | 4/2022 | Long | B60L 3/0061 | |
| 2022/0173634 A1* | 6/2022 | Gischler | H02K 7/14 | |
| 2022/0274693 A1* | 9/2022 | Sato | H02K 21/22 | |
| 2022/0371727 A1* | 11/2022 | Ross | B64D 27/24 | |
| 2023/0056974 A1* | 2/2023 | Foskey | B64C 27/30 | |
| 2023/0322376 A1* | 10/2023 | Hymer | B64C 11/001 | 244/56 |
| 2023/0339601 A1* | 10/2023 | Marshall | B64C 27/52 | |
| 2024/0117829 A1* | 4/2024 | Bernard | B64D 33/08 | |

* cited by examiner

LINEAR ACTUATOR SYSTEM

TECHNICAL FIELD

This disclosure relates in general to the field of aircraft, and more particularly, but not by way of limitation, to a rotor blade pitch actuation via a control tube through a rotor mast.

BACKGROUND

This section provides background information to facilitate a better understanding of the various aspects of the disclosure. It should be understood that the statements in this section of this document are to be read in this light, and not as admissions of prior art.

Controls for feathering rotor blades generally include pitch links coupled to pitch horns that extend externally from the blade cuff of each rotor blade, wherein actuation of the pitch links causes rotation of the rotor blades about their pitch-change axes. However, this arrangement requires placement of additional structure between the source of rotational energy and the plane of rotation. Such placement of additional structure may require a longer rotor mast between the source of rotational energy and the rotor hub, thereby decreases the stiffness of the rotor hub assembly.

SUMMARY

A linear actuator for axially translating a control tube to change the pitch of rotor blades at a top portion of the control tube, the linear actuator including an outer sleeve fixed in a stationary position with the control tube extending through the outer sleeve, a screw nut connected by a threaded interface to the control tube, and an actuator motor coupled to the screw nut to rotate the screw nut and thereby translate the control tube.

An exemplary rotor assembly includes a rotor mast to be driven in rotation about a mast axis, a rotor hub coupled to the rotor mast for common rotation therewith about the mast axis, a plurality of rotor blade assemblies coupled to the rotor hub for common rotation therewith about the mast axis, each rotor blade assembly being rotatable relative to the rotor hub about a pitch-change axis, a control tube extending through the rotor mast wherein a top portion extends above the rotor mast and a bottom portion extends below the rotor mast, the control tube being translatable relative to the rotor mast along the mast axis, a crosshead coupled to the control tube to cooperatively engage the plurality of rotor blade assemblies, wherein translation of the crosshead along the mast axis causes rotation of the plurality of rotor blade assemblies about their pitch-change axes, a rotor power mechanism to drive the rotor mast in rotation, wherein the rotor power mechanism is longitudinally positioned between the top portion and the bottom portion of the control tube, and a linear actuator coupled directly to the control tube to translate the control tube along the mast axis.

Another exemplary rotor assembly includes a rotor mast configured to be driven in rotation about a mast axis, a rotor hub coupled to the rotor mast for common rotation therewith about the mast axis, a plurality of rotor blade assemblies coupled to the rotor hub for common rotation therewith about the mast axis, each rotor blade assembly being rotatable relative to the rotor hub about a pitch-change axis, a control tube extending through the rotor mast wherein a top portion extends above the rotor mast and a bottom portion extends below the rotor mast, the control tube being translatable relative to the rotor mast along the mast axis, a crosshead coupled to the control tube, the crosshead being configured to cooperatively engage the plurality of rotor blade assemblies, wherein translation of the crosshead along the mast axis causes rotation of the plurality of rotor blade assemblies about their pitch-change axes, an electric motor to drive the rotor mast in rotation, the electric motor having a hollow inner diameter wherein the control tube extends through the hollowing inner diameter, and a linear actuator coupled directly to the control tube to translate the control tube along the mast axis, the linear actuator extending inside of the hollow inner diameter.

An exemplary aircraft includes a fuselage carrying a rotor assembly configured to provided vertical lift and/or forward thrust and including a rotor mast configured to be driven in rotation about a mast axis, a rotor hub coupled to the rotor mast for common rotation therewith about the mast axis, a plurality of rotor blade assemblies coupled to the rotor hub for common rotation therewith about the mast axis, each rotor blade assembly being rotatable relative to the rotor hub about a pitch-change axis, a control tube extending through the rotor mast wherein a top portion extends above the rotor mast and a bottom portion extends below the rotor mast, the control tube being translatable relative to the rotor mast along the mast axis, a crosshead coupled to the control tube to cooperatively engage the plurality of rotor blade assemblies, wherein translation of the crosshead along the mast axis causes rotation of the plurality of rotor blade assemblies about their pitch-change axes, a rotor power device having a hollow inner diameter to drive the rotor mast in rotation, wherein the rotor power device is longitudinally positioned between the top portion and the bottom portion of the control tube with the control tube extending through the hollow inner diameter, and a linear actuator coupled directly to the control tube to translate the control tube along the mast axis, the linear actuator including an outer sleeve fixed in a stationary position and extending into the hollow inner diameter, wherein the control tube extends through the outer sleeve, a screw nut connected by a threaded interface to the control tube, and an actuator motor coupled to the screw nut to rotate the screw nut and thereby translate the control tube.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
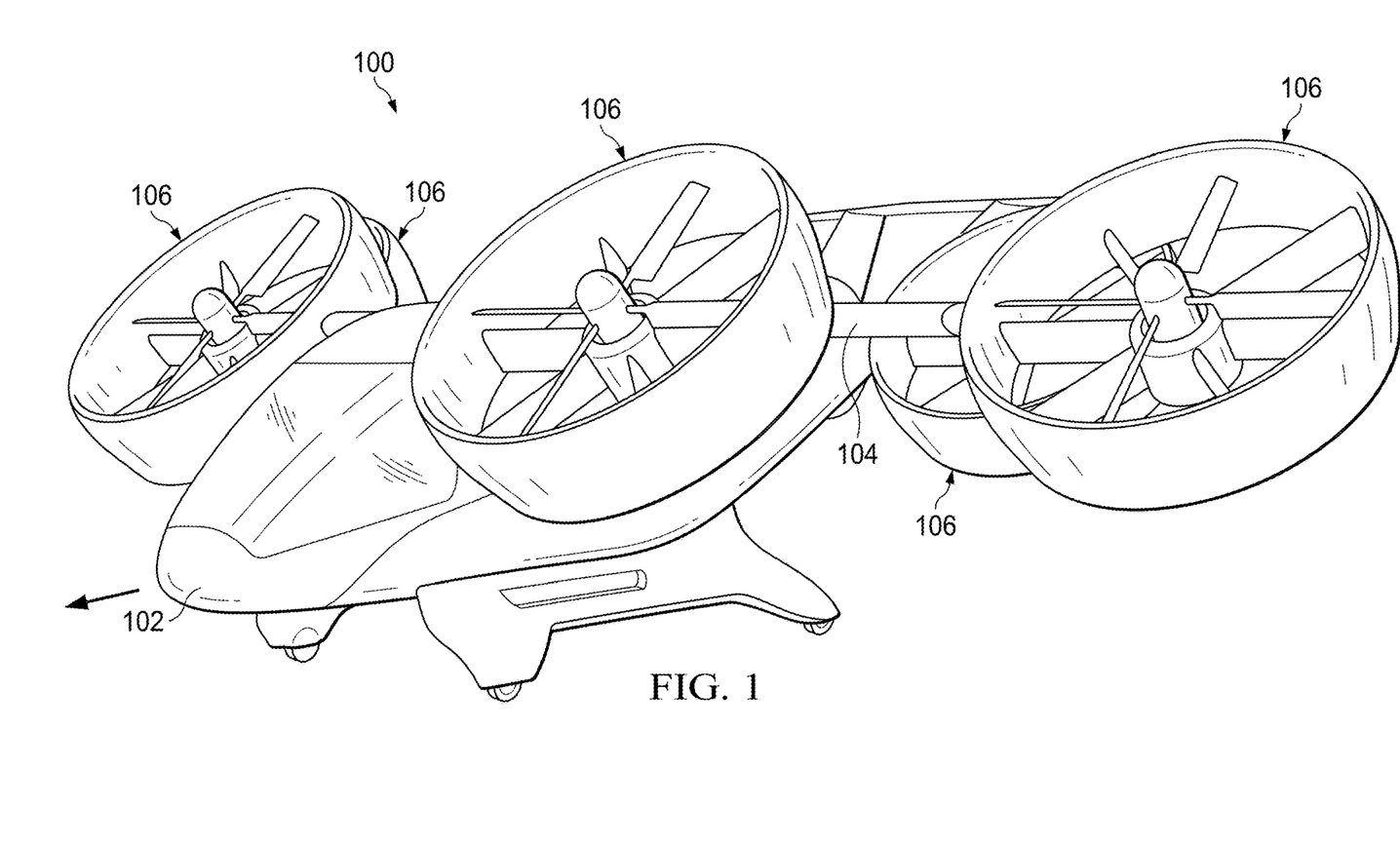
FIG. 1 illustrates an exemplary aircraft including a rotor assembly according to aspects of this disclosure.
Figure 2:
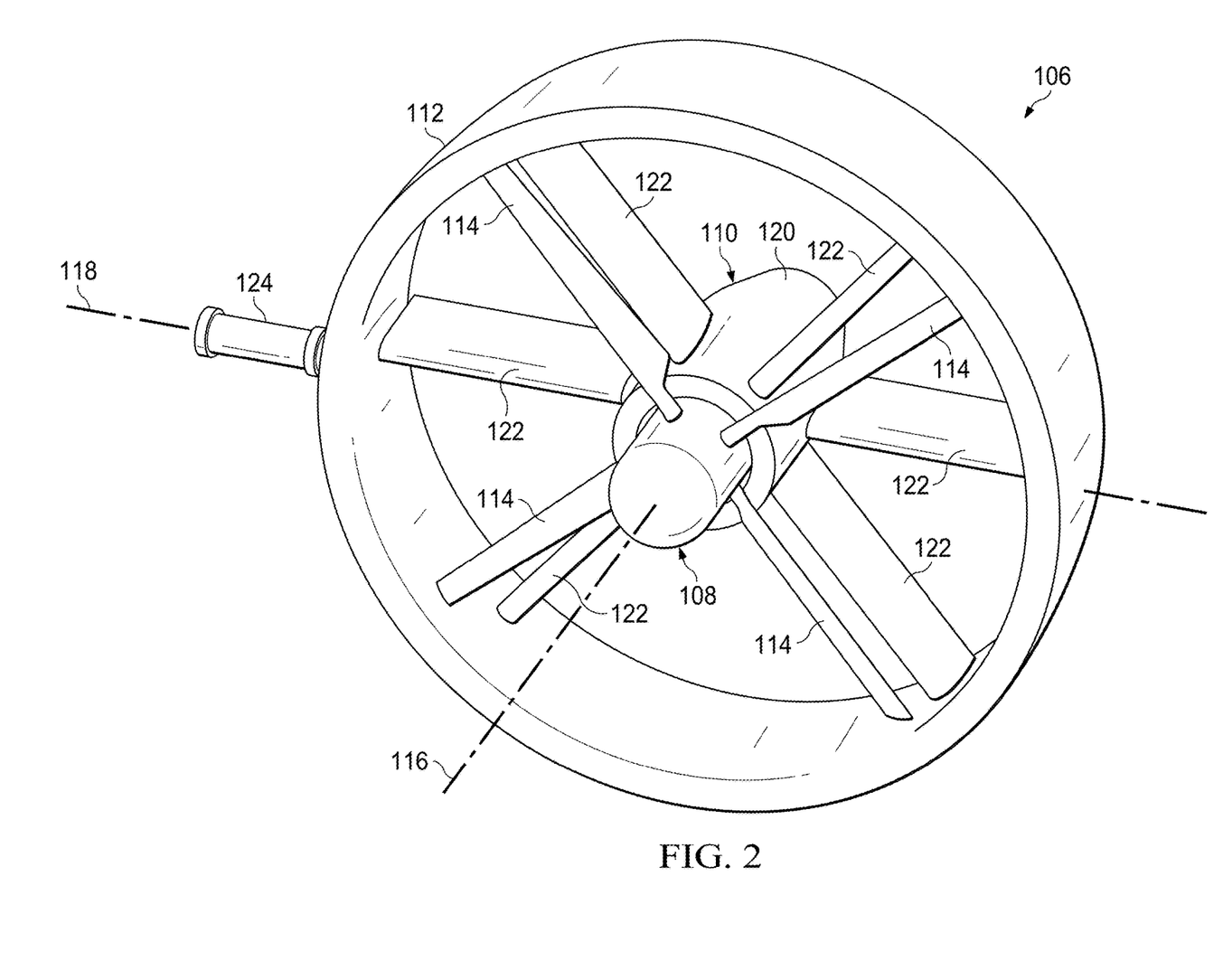
FIG. 2 illustrates an exemplary ducted fan of the aircraft of FIG. 1.

FIG. 1 illustrates an exemplary aircraft 100 that is convertible between a helicopter mode, which allows for vertical takeoff and landing, hovering, and low speed directional movement, and an airplane mode, which allows for forward flight as well as horizontal takeoff and landing. Aircraft 100 includes a fuselage 102, a wing 104, and a plurality of ducted fans 106 rotatably coupled to fuselage 102 or wing 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode, with ducted fans 106 in a vertically oriented first position, and thrust while operating in airplane mode, with ducted fans 106 rotated about a tilt axis 118 to a horizontally oriented second position. Stator assembly 110 is positioned downstream of rotor blades 114 and includes a stator hub 120 centrally located within duct 112 and a plurality of stator vanes 122 coupled between duct 112 and stator hub 120. Stator hub 120 houses a rotor power mechanism or device 136 (FIG. 5) configured to provide rotational energy to rotor assembly 108. The mechanism may comprise an electric motor configured to produce rotational energy. Alternatively, the mechanism may comprise a gearbox (transmission) to deliver rotational energy to rotor assembly 108. Wherein the gearbox receives rotational energy from a driveshaft passing through an attachment post 124 and the adjacent stator vane 122.

Referring now to FIGS. 1-5, the components of exemplary rotor assembly 108 are described. Rotor assembly 108 includes a rotor hub 126, a plurality of rotor blade assemblies 128 coupled to rotor hub 126, a rotor mast 130 coupled to rotor hub 126, a control tube 132 extending through rotor mast 130, a crosshead 134 coupled to control tube 132, and a rotor power mechanism 136 (e.g., electric motor, gearbox) to drive rotor mast 130 in rotation. Rotor hub 126 includes a plurality of hub arms 138. Each hub arm 138 includes a rotor blade opening 140 configured to receive a blade root 142 of one of rotor blades 114 therein. Rotor hub 126 also includes an access port configured to facilitate assembling rotor assembly 108. Each hub arm 138 includes an outer race of a thrust bearing 148 coupled thereto at the innermost end of rotor blade opening 140. Rotor hub 126 may be directly coupled to rotor mast 130 for common rotation therewith about mast axis 116. Alternatively, rotor hub 126 may be coupled to rotor mast 130 via a mast adapter 150. Rotor hub 126 further includes a fairing 152 coupled thereto which covers the access port during operation of rotor assembly 108.

Figure 3:
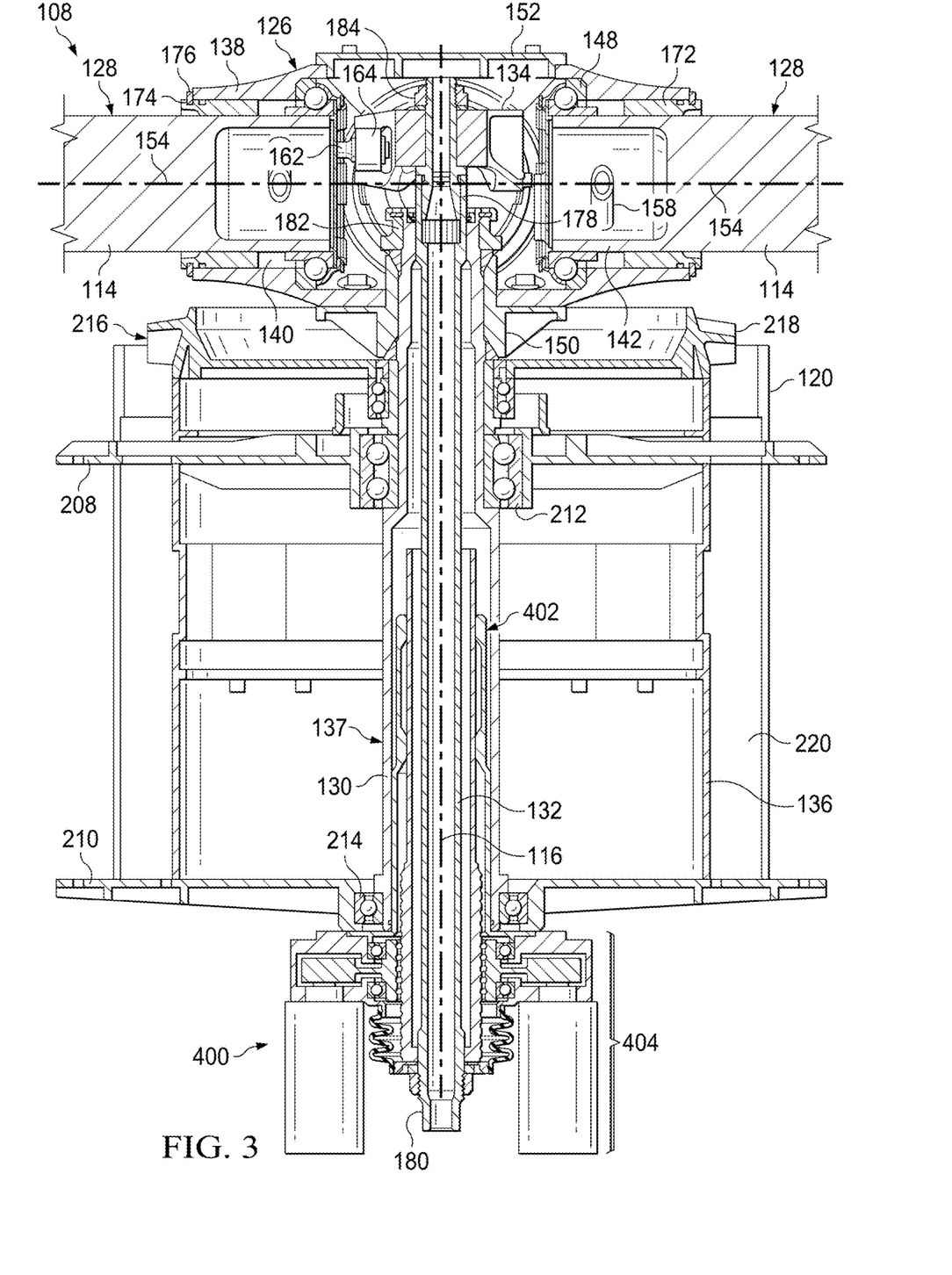
FIG. 3 is a sectional view of an exemplary rotor assembly utilizing an exemplary linear actuator according to aspects of this disclosure.

Each rotor blade assembly 128 includes one rotor blade 114 with its blade root 142 disposed within one of hub arms 138 and being rotatable relative thereto about a pitch-change axis 154. An inner race of thrust bearing 148 encircles each blade root 142 and is coupled thereto via a fastener 158. Each rotor assembly 128 further includes a plurality of roller elements of thrust bearing 148 positioned around the circumference of the inner race. The roller elements carry the axial loads along pitch-change axis 154 while enabling rotor blade 114 to rotate about pitch-change axis 154. Each rotor blade assembly 128 also includes a pin 162 extending from blade root 142 configured to impart rotation of rotor blade 114 about pitch-change axis 154 in response to translation of crosshead 134 along mast axis 116. Pin 162 may be coupled to an inner race, coupled directly to blade root 142, or, as shown, pin 162 may be unitarily formed with the inner race. Furthermore, pin 162 may include a roller bearing 164 coupled thereto to permit translation of pin 162 relative to crosshead 134. While crosshead 134 is shown as being disposed within rotor hub 126 and pins 162 extending inward, it should be understood that crosshead 134 could be positioned above rotor hub 126 and could be coupled to pitch horns extending laterally from rotor blades 114. An endcap is coupled to the innermost end of rotor blade 114 and/or inner race and a roller element retainer is coupled to the endcap via a retaining ring. While shown as a separate component, it should be understood that endcap may be unitarily formed with the inner race. A roller or journal bearing 172 is coupled to each rotor blade 114 adjacent to the inner race to react shear loads between rotor blade 114 and hub arm 138. Journal bearing 172 includes a groove that receives a rotor blade retainer 176 therein to resist inward movement of rotor blade assembly 128 after the assembly of rotor assembly 108 is complete.

Control tube 132 extends coaxially through rotor mast 130 such that a top portion 178 extends above rotor mast 130 and a bottom portion 180 extends below rotor mast 130. Control tube 132 is rotationally stationary relative to rotor mast 130 and translatable relative to rotor mast 130 along mast axis 116. Mast adapter 150 is coupled to rotor mast 130 via a mast nut 182. Crosshead 134 is coupled to top portion 178 of control tube 132 via a nut 184.

Crosshead 134 may comprise a multi-part or a unitary structure and includes a plurality of slots, each being defined by an upper tab and a lower tab. Each slot is configured to receive one pin 162 therein, such that upwards translation of control tube 132 along mast axis 116 causes the lower tabs to push pins 162 upward, through roller bearings 164, causing rotation of rotor blades 114 about pitch-change axes 154 in a first direction and downwards translation of control tube 132 along mast axis 116 causes the upper tabs to push pins 162 downwards, through roller bearings 164, causing rotation of rotor blades 114 about pitch-change axes 154 in an opposite second direction.

As shown in FIG. 3, exemplary rotor assembly 108 includes a rotor power mechanism 136, e.g., electric motor or transmission longitudinally positioned between top portion 178 and bottom portion 180 of control tube 132. In the illustrated example, rotor mast 130 comprises a drive shaft of rotor power mechanism 136. Rotor power mechanism, or device, includes a hollow inner diameter 137. Rotor mast 130 extends into hollow inner diameter 137 and control tube 132 extends through the hollow inner diameter with top portion 178 located above the hollow inner diameter and bottom portion 180 located below the hollow inner diameter.

Rotor power mechanism 136 is coupled to stator hub 120 via a top bracket 208 and a bottom bracket 210. Rotor mast 130 is coupled to top bracket 208 via a top mast bearing 212 and to bottom bracket 210 via a bottom mast bearing 214. A fan 216 is positioned between rotor hub 126 and rotor power mechanism 136. Fan 216 includes fan blades 218 configured to direct cooling airflow through a channel 220 between rotor power mechanism 136 and stator hub 120. Fan 216 may also receive rotational energy from rotor power mechanism 136.

Translation of control tube 132 and crosshead 134 is implemented by a linear actuator 400 that is coupled directly to control tube 132. For example, linear actuator 400 is not coupled to the control tube by a trunnion such as utilized in prior art and contemporary rotor assemblies such as described in US Patent Application Publication 2021/0139157, the teachings of which are incorporated herein. An exemplary linear actuator 400 is a ball screw, lead screw, or roller screw actuator. As illustrated in FIG. 3, an upper portion 402 of linear actuator 400 is positioned inside of hollow inner diameter 137. A lower portion 404 is positioned outside, e.g., below, hollow inner diameter 137 allowing for inspection of the system. Implementation of a linear actuator coupled directly to the control tube and nested, at least in part, inside of the rotor power mechanism provides a compact height profile and minimizes weight thereby maximizing control system stiffness and minimizing lost motion.

Figure 4:
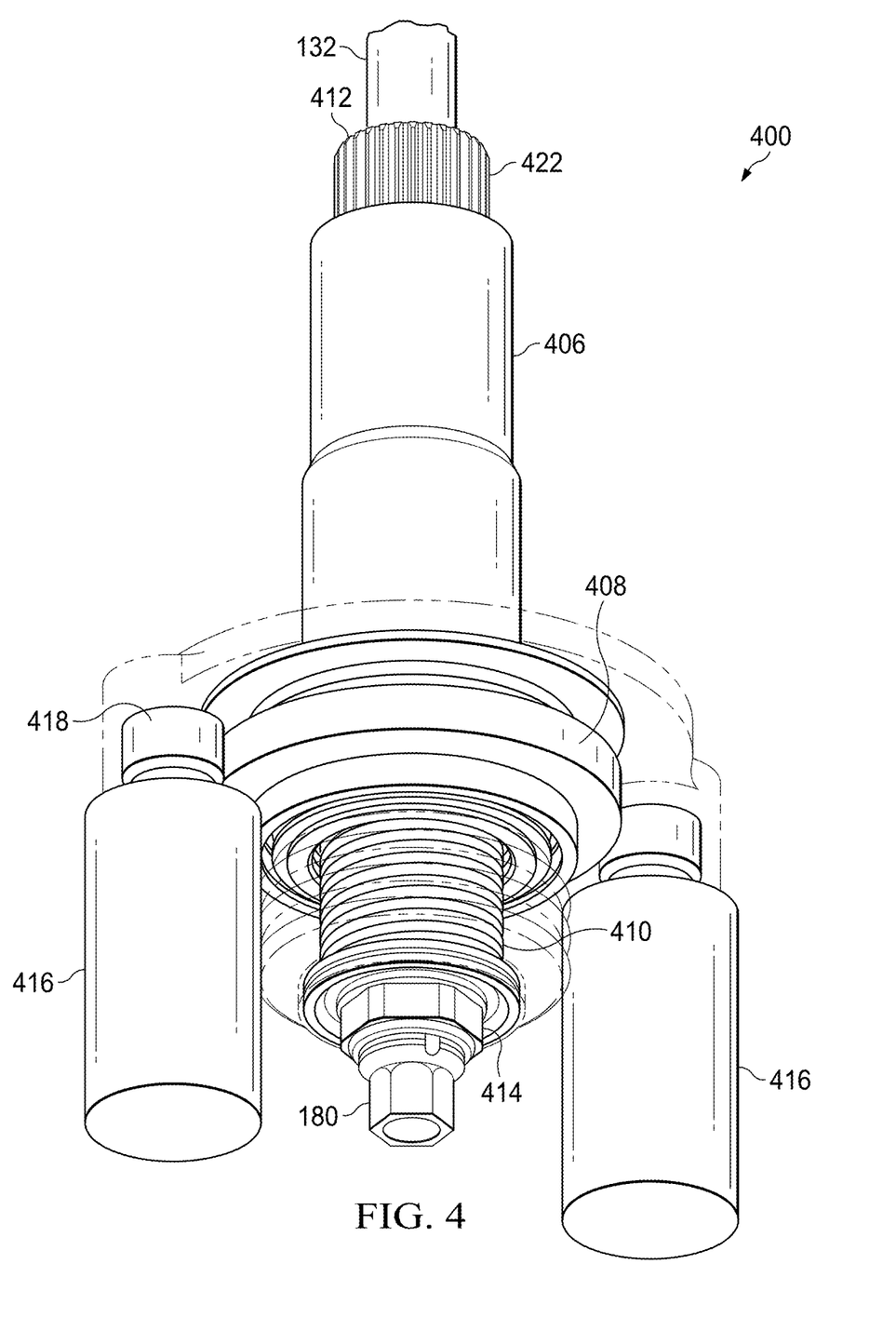
FIG. 4 illustrates an exemplary linear actuator with a control tube.
Figure 5:
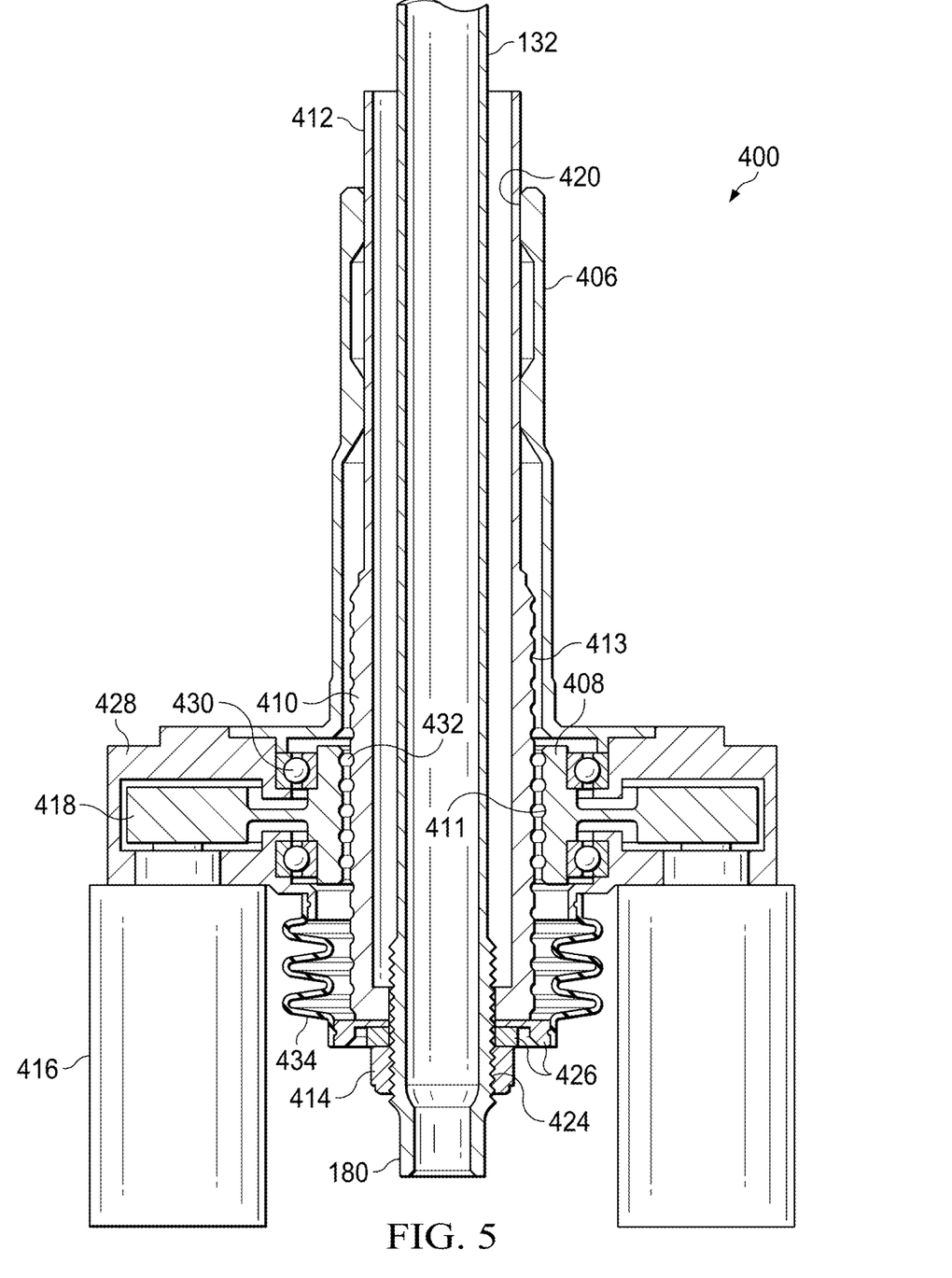
FIG. 5 is a sectional view of an exemplary linear actuator with a control tube.

FIGS. 4 and 5 illustrate an exemplary linear actuator 400 that is described with additional reference to FIGS. 1-3. Exemplary linear actuator 400 includes an outer sleeve 406, e.g., guide sleeve, that is fixed in a stationary position. For example, guide sleeve 406 may be secured to bracket 210 (FIG. 3). Guide sleeve 406 extends inside of hollow inner diameter 137 of rotor power mechanism 136 (FIG. 3) and may extend inside of rotor mast 130. Control tube 132 extends axially through guide sleeve 406 with bottom portion 180 positioned outside of, and below, guide sleeve 406.

Linear actuator 400 includes a ball nut 408 and ball screw 412. Bottom portion 180 of control tube 132 threads (threads 424) into ball screw 412 and is locked in place via lock plates 426 and jam nut 414. Lock plates 426 slide over threads 424 on bottom portion 180. Ball nut 408 is connected to ball screw 412, and thus control tube 132, through a threaded interface 410. In the illustrated example, threaded interface 410 includes internal threads 411 on ball nut 408 and external threads 413 on ball screw 412, e.g., inner sleeve, that is fixedly connected to control tube 132, by jam nut 414 and lock plates 426. An environmental boot 434 is shown in FIG. 5 covering the external threads 413 below ball nut 408.

Actuator motor 416 is carried by an actuator chassis 428 that may be secured to guide sleeve 406 and/or bracket 210 (FIG. 3). Ball nut 408 is supported by bearings 430 in chassis 428 providing the rotational degree of freedom and react the rotor blade pitch control loads. Ball nut 408 is axially fixed relative to guide sleeve 406. Actuator motor 416 is coupled to ball nut 408, for example by a geared interface 418 (e.g., torque summing or speed summing), or by direct drive. Internal threads 411 (e.g., helical threads) of ball nut 408 provide raceway for rollers 432, e.g., balls, at threaded interface 410. Actuator motor 416 rotates ball nut 408 causing ball screw 412 and control tube 132 to axially translate relative to guide sleeve 406. Actuator motor 416 may be, for example, an electric, hydraulic, or pneumatic motor. In the illustrated example, the linear actuator includes redundant actuator motors 416. Translation of control tube 132 may be aided by a splined interface of internal splines 420 located on guide sleeve 406 and external splines 422 (FIG. 4) on ball screw 412.

The term "substantially," "about," "generally," and similar terms are used as terms of approximation and not a terms of degrees, and are intended to account for the inherent deviations in measured and calculated values that would be recognized by a person of skill in the art. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotor assembly, comprising:
   a rotor mast to be driven in rotation about a mast axis;
   a rotor hub coupled to the rotor mast for common rotation therewith about the mast axis;
   a plurality of rotor blade assemblies coupled to the rotor hub for common rotation therewith about the mast axis, each rotor blade assembly being rotatable relative to the rotor hub about a pitch-change axis;

a control tube extending through the rotor mast wherein a top portion extends above the rotor mast and a bottom portion extends below the rotor mast, the control tube being translatable relative to the rotor mast along the mast axis;

a crosshead coupled to the control tube to cooperatively engage the plurality of rotor blade assemblies, wherein translation of the crosshead along the mast axis causes rotation of the plurality of rotor blade assemblies about their pitch-change axes;

a rotor power mechanism to drive the rotor mast in rotation, wherein the rotor power mechanism has a hollow inner diameter and is longitudinally positioned between the top portion and the bottom portion of the control tube; and a linear actuator coupled directly to the control tube to translate the control tube along the mast axis, wherein an upper portion of the linear actuator is located inside of the hollow inner diameter and a lower portion of the linear actuator is located below the hollow inner diameter.

2. The rotor assembly of claim 1, wherein the linear actuator comprises:
an outer sleeve fixed in a stationary position;
an actuator screw internally disposing and fixed to the control tube, the actuator screw slidingly disposed in the outer sleeve;
a screw nut connected to the actuator screw by a threaded interface; and
an actuator motor coupled to the screw nut.

3. The rotor assembly of claim 2, wherein the screw nut is axially fixed relative to the outer sleeve; and
the actuator screw comprises external splines that engage with internal splines in the outer sleeve.

4. The rotor assembly of claim 3, wherein the screw nut is positioned below the outer sleeve and the rotor power mechanism.

5. The rotor assembly of claim 2, wherein the actuator screw comprises external splines that engage with internal splines in the outer sleeve.

6. The rotor assembly of claim 1, wherein the rotor power mechanism is an electric motor or a gearbox.

7. The rotor assembly of claim 6, wherein the rotor mast comprises a drive shaft of the rotor power mechanism.

8. The rotor assembly of claim 1, wherein the linear actuator is a screw actuator.

9. The rotor assembly of claim 8, wherein the screw actuator is driven by an electric motor.

10. The rotor assembly of claim 1, wherein the linear actuator is not coupled to the control tube via a trunnion.

11. The rotor assembly of claim 1, wherein the linear actuator comprises:
an outer sleeve fixed in a stationary position with the control tube extending through the outer sleeve;
a screw nut axially fixed relative to the outer sleeve and connected to the bottom portion of the control tube by a threaded interface; and
an actuator motor coupled to the screw nut to rotate the screw nut and thereby translate the control tube.

12. A rotor assembly, comprising:
a rotor mast configured to be driven in rotation about a mast axis;
a rotor hub coupled to the rotor mast for common rotation therewith about the mast axis;
a plurality of rotor blade assemblies coupled to the rotor hub for common rotation therewith about the mast axis, each rotor blade assembly being rotatable relative to the rotor hub about a pitch-change axis;

a control tube extending through the rotor mast wherein a top portion extends above the rotor mast and a bottom portion extends below the rotor mast, the control tube being translatable relative to the rotor mast along the mast axis;

a crosshead coupled to the control tube, the crosshead being configured to cooperatively engage the plurality of rotor blade assemblies, wherein translation of the crosshead along the mast axis causes rotation of the plurality of rotor blade assemblies about their pitch-change axes;

an electric motor to drive the rotor mast in rotation, the electric motor having a hollow inner diameter wherein the control tube extends through the hollowing inner diameter; and a linear actuator coupled directly to the control tube to translate the control tube along the mast axis, the linear actuator extending inside of the hollow inner diameter.

13. The rotor assembly of claim 12, wherein the linear actuator is a screw actuator.

14. The rotor assembly of claim 12, wherein the linear actuator comprises:
an outer sleeve fixed in a stationary position with the control tube extending through the outer sleeve;
a screw nut axially fixed relative to the outer sleeve and connected to the bottom portion of the control tube via a threaded interface; and
an actuator motor coupled to the screw nut to rotate the screw nut and thereby translate the control tube.

15. The rotor assembly of claim 12, wherein the linear actuator comprises:
an outer sleeve fixed in a stationary position;
an actuator screw internally disposing and fixed to the control tube, the actuator screw slidingly disposed in the outer sleeve;
a screw nut axially fixed relative to the outer sleeve and connected to the actuator screw by a threaded interface; and
an actuator motor coupled to the screw nut to rotate the screw nut and thereby translate the control tube.

16. An aircraft, comprising:
a fuselage carrying a rotor assembly configured to provided vertical lift and/or forward thrust, the rotor assembly comprising:
a rotor mast configured to be driven in rotation about a mast axis;
a rotor hub coupled to the rotor mast for common rotation therewith about the mast axis;
a plurality of rotor blade assemblies coupled to the rotor hub for common rotation therewith about the mast axis, each rotor blade assembly being rotatable relative to the rotor hub about a pitch-change axis;
a control tube extending through the rotor mast wherein a top portion extends above the rotor mast and a bottom portion extends below the rotor mast, the control tube being translatable relative to the rotor mast along the mast axis;
a crosshead coupled to the control tube to cooperatively engage the plurality of rotor blade assemblies, wherein translation of the crosshead along the mast axis causes rotation of the plurality of rotor blade assemblies about their pitch-change axes;
a rotor power device having a hollow inner diameter to drive the rotor mast in rotation, wherein the rotor power device is longitudinally positioned between the top portion and the bottom portion of the control tube with the control tube extending through the hollow inner diameter; and a linear actuator coupled directly to the control tube to translate the control tube along the mast axis, the linear actuator comprising:

an outer sleeve fixed in a stationary position and extending into the hollow inner diameter, wherein the control tube extends through the outer sleeve;

a screw nut connected by a threaded interface to the control tube; and an actuator motor coupled to the screw nut to rotate the screw nut and thereby translate the control tube.

17. The aircraft of claim 16, wherein the rotor assembly is configured to rotate relative to the fuselage between a first position to produce lift and a second position to produce forward thrust.

18. The aircraft of claim 17, wherein the threaded interface is located on an actuator screw internally disposing and fixed to the control tube, the actuator screw slidingly disposed in the outer sleeve.

19. The aircraft of claim 16, wherein the threaded interface is located on an actuator screw that internally disposes and is fixed to the control tube, the actuator screw slidingly disposed in the outer sleeve.

* * * * *